United States Patent
Kitamorn et al.

(10) Patent No.: US 7,107,495 B2
(45) Date of Patent: Sep. 12, 2006

(54) METHOD, SYSTEM, AND PRODUCT FOR IMPROVING ISOLATION OF INPUT/OUTPUT ERRORS IN LOGICALLY PARTITIONED DATA PROCESSING SYSTEMS

(75) Inventors: Alongkorn Kitamorn, Austin, TX (US); Ashwini Kulkarni, Austin, TX (US); Michael Anthony Perez, Cedar Park, TX (US); David R. Willoughby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 10/464,889

(22) Filed: Jun. 19, 2003

(65) Prior Publication Data

US 2004/0260981 A1    Dec. 23, 2004

(51) Int. Cl.
*G06F 11/00* (2006.01)
(52) U.S. Cl. ......................................... 714/43; 714/56
(58) Field of Classification Search .................. 714/43, 714/56
See application file for complete search history.

(56) References Cited

U.S. PATENT DOCUMENTS 5,815,647 A * 9/1998 Buckland et al. ............... 714/3
6,523,140 B1 * 2/2003 Arndt et al. ................... 714/44
6,633,996 B1 * 10/2003 Suffin et al. .................... 714/4
6,643,727 B1 * 11/2003 Arndt et al. ................. 710/314
6,901,537 B1 * 5/2005 Dawkins et al. .............. 714/43
6,944,152 B1 * 9/2005 Heil ........................... 370/360
2003/0172322 A1 * 9/2003 Kitamorn et al. ............. 714/43
2004/0064761 A1 * 4/2004 Harrington et al. ........... 714/43
2004/0153853 A1 * 8/2004 Moriki et al. ................. 714/43
2004/0225792 A1 * 11/2004 Garnett ....................... 710/300
2004/0260982 A1 * 12/2004 Bhowmik et al. ............. 714/43

* cited by examiner

*Primary Examiner*—Scott Baderman
*Assistant Examiner*—Loan Truong
(74) *Attorney, Agent, or Firm*—Duke W. Yee; Mark E. McBurney; Lisa L. B. Yociss

(57) ABSTRACT

A method, system, and computer program product are disclosed for improving isolation of I/O errors in logical partitioned data processing systems. A machine check is generated that indicates that an I/O error has occurred in the system. The PCI host bridge (PHB) that generated the machine check is identified. The system includes multiple PHBs, each with its own set of slots. Some of these slots may be enabled for enhanced error handling while others of them are not. The adapters that are not enabled for enhanced error handling and that are coupled to the PHB that generated the machine check are identified. It is then determined that the I/O error occurred in at least one of these slots that are not enabled for enhanced error handling.

36 Claims, 3 Drawing Sheets

METHOD, SYSTEM, AND PRODUCT FOR IMPROVING ISOLATION OF INPUT/OUTPUT ERRORS IN LOGICALLY PARTITIONED DATA PROCESSING SYSTEMS

BACKGROUND OF THE INVENTION

1. Technical Field

The present invention relates generally to an improved data processing system, and in particular to a method, system, and product for handling errors in a data processing system. Still more particularly, the present invention provides a method, system, and product for improving isolation of I/O errors in logically partitioned data processing systems.

2. Description of Related Art

A logical partitioned (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and input/output (I/O) adapter bus slots. The partition's resources are represented by the platform's firmware to the OS image.

Each distinct OS or image of an OS running within the platform is protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

With respect to hardware resources in an LPAR system, these resources are disjointly shared among various partitions, themselves disjoint, each one appearing to be a stand-alone computer. These resources may include, for example, input/output (I/O) adapters, memory dimms, non-volatile random access memory (NVRAM), and hard disk drives. Each partition within the LPAR system may be booted and shutdown repeatedly without having to power-cycle the whole system.

In reality, some of the I/O devices that are disjointly shared among the partitions are themselves controlled by a common piece of hardware, such as a host Peripheral Component Interface (PCI) bridge, which may have many I/O adapters controlled or below the bridge. This bridge may be thought of as being shared by all of the partitions that are assigned to its slots. Hence, if the bridge becomes inoperable, it affects all of the partitions that share the devices that are below the bridge. Indeed, the problem itself may be so severe that the whole LPAR system will crash if any partition attempts to further use the bridge. In other words, with a crash, the entire LPAR system fails. The normal course of action is to terminate the running partitions that share the bridge, which will keep the system from crashing due to this failure.

When an I/O adapter error occurs, the PCI Host Bridge (PHB) to which the I/O adapter is coupled assumes a non-usable, or error, state. This PHB then generates a machine check which in turn invokes a machine check interrupt (MCI) handler. The MCI handler reports the error and terminates the partitions to which the PHB is assigned. This process is a "normal" solution that prevents the whole LPAR system from crashing due to an I/O adapter error.

A single PHB typically supports multiple slots each of which may be assigned to different partitions. When an I/O adapter error occurs in a slot that is supported by a PHB which also supports other slots which are assigned to different partitions, the I/O adapter error will cause the termination of the partition to which the faulty I/O adapter is assigned and will also cause the termination of other partitions to which the other slots of the PHB are assigned when the adapter that generated the error does not support extended error handling. The problem described above occurs when the faulty adapter that has the error does not support extended error handling (EEH). When a faulty adapter does support EEH, the EEH features prevent the I/O adapter error from propagating from the slot to the PHB which supports the slot. When a faulty adapter does not support EEH, the I/O adapter error propagates, as described above, from the slot to the PHB which supports the slot.

When an error as a result of a faulty adapter that does not support EEH is allowed to propagate to the PHB, the PHB enters a "freeze" mode that causes all further accesses to any slot supported by the PHB to fail. Thus, a single error that should have affected only one partition ends up propagating across one or more other partitions which should have been independent of each other.

When an error occurs, a service call is made which indicates each field replacement unit (FRU) that must be replaced in order to clear the error. When the PHB enters the freeze mode as a result of an adapter that does not support EEH, the FRU calls out each slot, any device coupled to each slot, as well as the system planar. Thus, an FRU calls out each slot, device, and system planar even though only one I/O slot may have generated the error. Obviously, it is much more expensive to replace all of these hardware components instead of just replacing the faulty I/O adapter.

Therefore, a need exists for a method, system, and product for improving isolation of I/O errors in logical partitioned data processing systems by identifying only occupied slots that have adapters that do not support EEH.

SUMMARY OF THE INVENTION

The present invention provides a method, system, and computer program product for improving the isolation of I/O errors in logically partitioned data processing systems. A machine check is generated that indicates that an I/O error has occurred in the system. The PCI host bridge (PHB) that generated the machine check is identified. The system includes multiple PHBS, each with its own set of slots. Some of these slots may have coupled to them adapters that are enabled for enhanced error handling while others of the slots do not. The slots that have adapters that are not enabled for enhanced error handling and that are coupled to the PHB that generated the machine check are identified. It is then determined that the I/O error occurred in at least one of these slots that have adapters that are not enabled for enhanced error handling.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

A method, system, and computer program product are disclosed for improving isolation of I/O errors in logically partitioned data processing systems. The logically partitioned data processing system includes a plurality of PCI host bridges (PHBs). Each PHB has coupled to it a set of I/O slots for receiving I/O adapters. When a fault occurs in one of the slots, the PHB to which this slot is coupled enters a freeze state, and any further access of this hardware will cause a machine check to occur. When a machine check occurs, the machine check handler determines which PHB caused the machine check by reading the hardware registers.

Once the PHB that caused the machine check is identified, the machine check handler will unfreeze the state of the PHB and then read the EADS's chip registers to determine which slots are occupied and include adapters that are EEH enabled and which include adapters that are not EEH enabled. A determination is then made that the error occurred in one of the slots that includes an adapter that is not EEH enabled. These slots that are coupled to non-EEH adapter are identified, and the identification is stored in an error log. A service call may then be made identifying only the slots of the PHB which generated the machine check that include non-EEH adapters. Thus, service personnel need replace fewer hardware components in order to correct the error.

Figure 1:
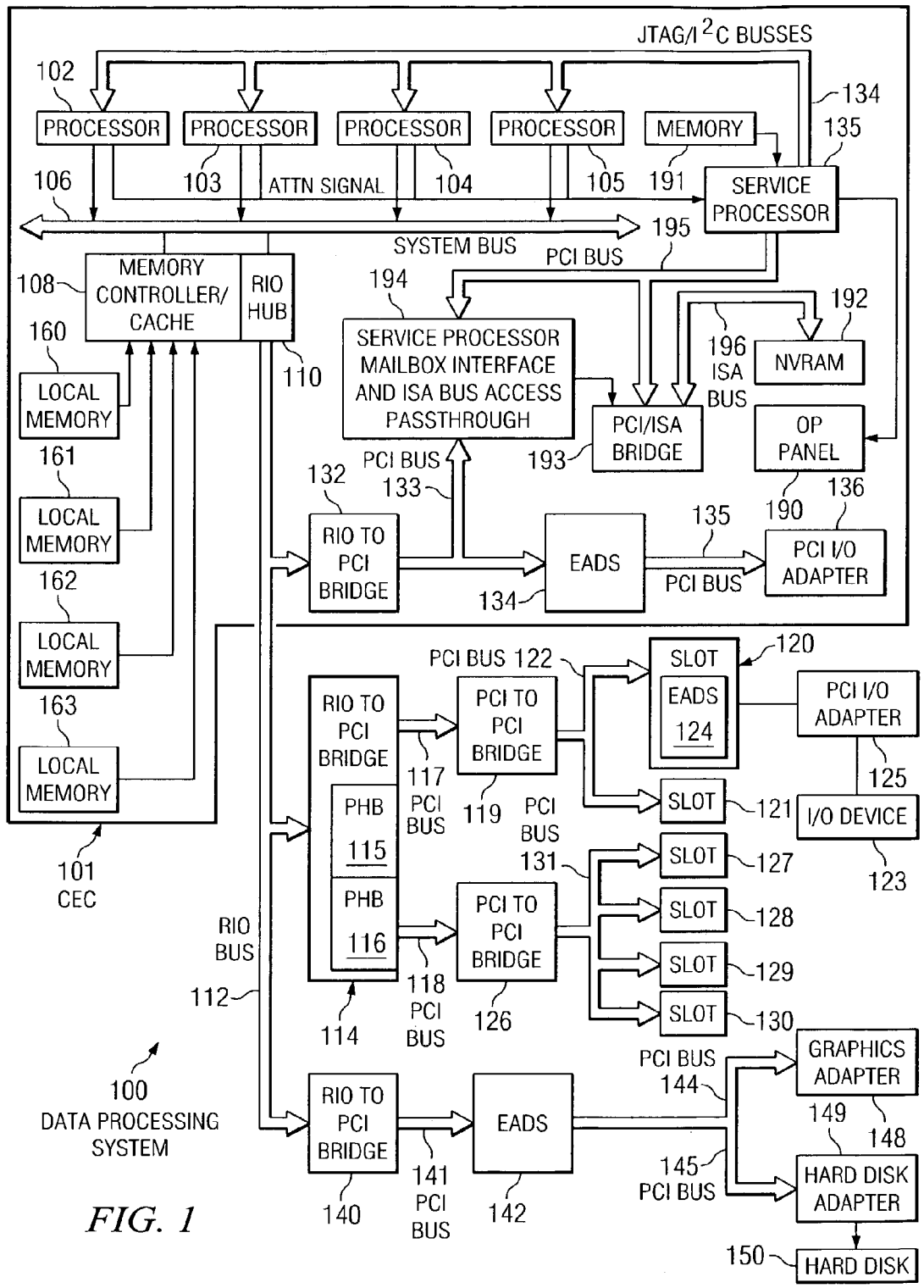
FIG. 1 is a block diagram of a data processing system in which the present invention may be implemented in accordance with the present invention.

FIG. 1 depicts a block diagram of a data processing system in which the present invention may be implemented in accordance with the present invention. Data processing system 100 may be a symmetric multiprocessor (SMP) system including a plurality of processors 102, 103, 104, and 105 connected to system bus 106. For example, data processing system 100 may be an IBM RS/6000, a product of International Business Machines Corporation in Armonk, N.Y. Data processing system 100 includes a central electronic complex 101 which includes logically partitioned hardware. CEC 101 includes a plurality of processors 102, 103, 104, and 105 connected to system bus 106. Alternatively, a single processor system may be employed. Also connected to system bus 106 is memory controller/cache 108, which provides an interface to a plurality of local memories 160–163. RIO Hub 110 is connected to system bus 106 and provides an interface to RIO bus 112. Memory controller/cache 108 and RIO Hub 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI slots, to which PCI I/O adapters may be coupled, such as slots 120, 121, and 127–130, graphics adapter 148, and hard disk adapter 149 may each be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of slots 120, 121, and 127–130, graphics adapter 148, hard disk adapter 149, each of host processors 102–105, and each of local memories 160–163 is assigned to one of the three partitions. For example, processor 102, local memory 160, and slots 120, 127, and 129 may be assigned to logical partition P1; processors 103–104, local memory 161, and slot 121 may be assigned to partition P2; and processor 105, local memories 162–163, slots 128 and 130, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance, also called an image, of the AIX operating system may be executing within partition P2, and a Windows 2000 operating system may be operating within logical partition P1. Windows 2000 is a product and trademark of Microsoft Corporation of Redmond, Wash.

RIO to PCI bridge 114 is connected to RIO bus 112 and provides an interface to PCI bus 117 and PCI bus 118. RIO to PCI bridge 114 includes one or more PCI host bridges (PHB), such as PHB 115 and PHB 116. Each PHB is coupled to a PCI to PCI bridge through a PCI bus. For example, PHB 115 is coupled to PCI to PCI bridge 119 through PCI bus 117. PHB 116 is coupled to PCI to PCI bridge 126 through PCI bus 118. Each PCI to PCI bridge is coupled to one or more PCI slots. For example, PCI to PCI bridge 119 is coupled to slot 120 and slot 121 using PCI bus 122. Although only two slots are shown, typically either four or eight slots are supported by each PHB. PCI to PCI bridge 126 is coupled to slots 127–130 using PCI bus 131.

Each slot includes an EADS chip to which a PCI I/O adapter may be attached. For example, slot 120 includes EADS 124. An I/O adapter may be inserted into a slot and thus coupled to an EADS. For example, I/O adapter 125 is inserted into slot 120 and coupled to EADS 124. An I/O device may be coupled to data processing system 100 utilizing an I/O adapter. For example, as depicted, I/O device 123 is coupled to I/O adapter 125.

A memory mapped graphics adapter 148 may be connected to RIO bus 112 through PCI bus 144, EADS 142, PCI bus 141, and RIO to PCI bridge 140. A hard disk 150 may be coupled to hard disk adapter 149 which is connected to PCI bus 145. In turn, this bus is connected to EADS 142, which is connected to RIO to PCI Bridge 140 by PCI bus 141.

An RIO to PCI bridge 132 provides an interface for a PCI bus 133 to connect to RIO bus 112. PCI I/O adapter 136 is connected to EADS 134 by PCI bus 135. EADS 132 is connected to PCI bus 133. This PCI bus also connects RIO to PCI bridge 132 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 102–105 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 102, 103, 104, and 105 are connected together to an interrupt input signal of the service processor. The service processor 135 has its own local memory 191, and has access to the hardware OP-panel 190.

When data processing system 100 is initially powered up, service processor 135 uses the JTAG/scan I$^2$C busses 134 to interrogate the system (host) processors 102–105, memory controller/cache 108, and RIO Hub 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 102–105, memory controller/cache 108, and RIO Hub 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases the host processors 102–105 for execution of the code loaded into host memory 160–163. While the host processors 102–105 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 102–105, local memories 160–163, and RIO Hub 110. Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
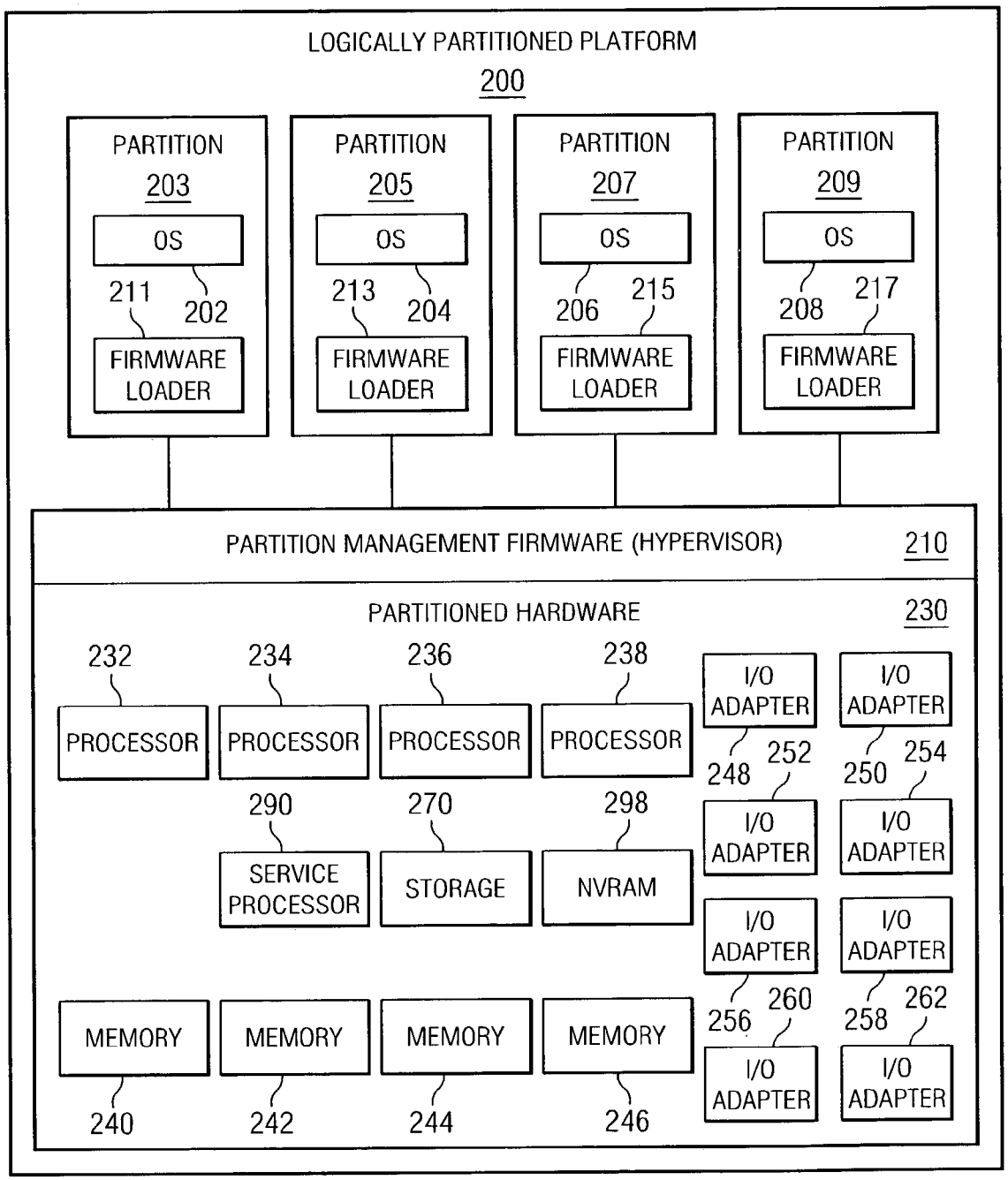
FIG. 2 is a block diagram of an exemplary logically partitioned platform in which the present invention may be implemented in accordance with the present invention.

With reference now to FIG. 2, a block diagram of an exemplary logically partitioned platform is depicted in which the present invention may be implemented. The hardware in logically partitioned platform 200 may be implemented as, for example, data processing system 100 in FIG. 1. Logically partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209. Additionally, these partitions also include firmware loaders 211, 213, 215, and 217. When partitions 203, 205, 207, and 209 are instantiated, a copy of the open firmware is loaded into each partition by the hypervisor's partition manager. The processors associated or assigned to the partitions are then dispatched to the partitions' memory to execute the partition firmware.

Partitioned hardware 230 includes a plurality of processors 232–238, a plurality of system memory units 240–246, a plurality of input/output (I/O) adapters 248–262, and a storage unit 270. Partitioned hardware 230 also includes service processor 290, which may be used to provide various services, such as processing of errors in the partitions. Each of the processors 232–238, memory units 240–246, NVRAM storage 298, and I/O adapters 248–262 may be assigned to one of multiple partitions within logically partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logically partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 202, 204, 206, and 208 by virtualizing all the hardware resources of logically partitioned platform 200.

Figure 3:
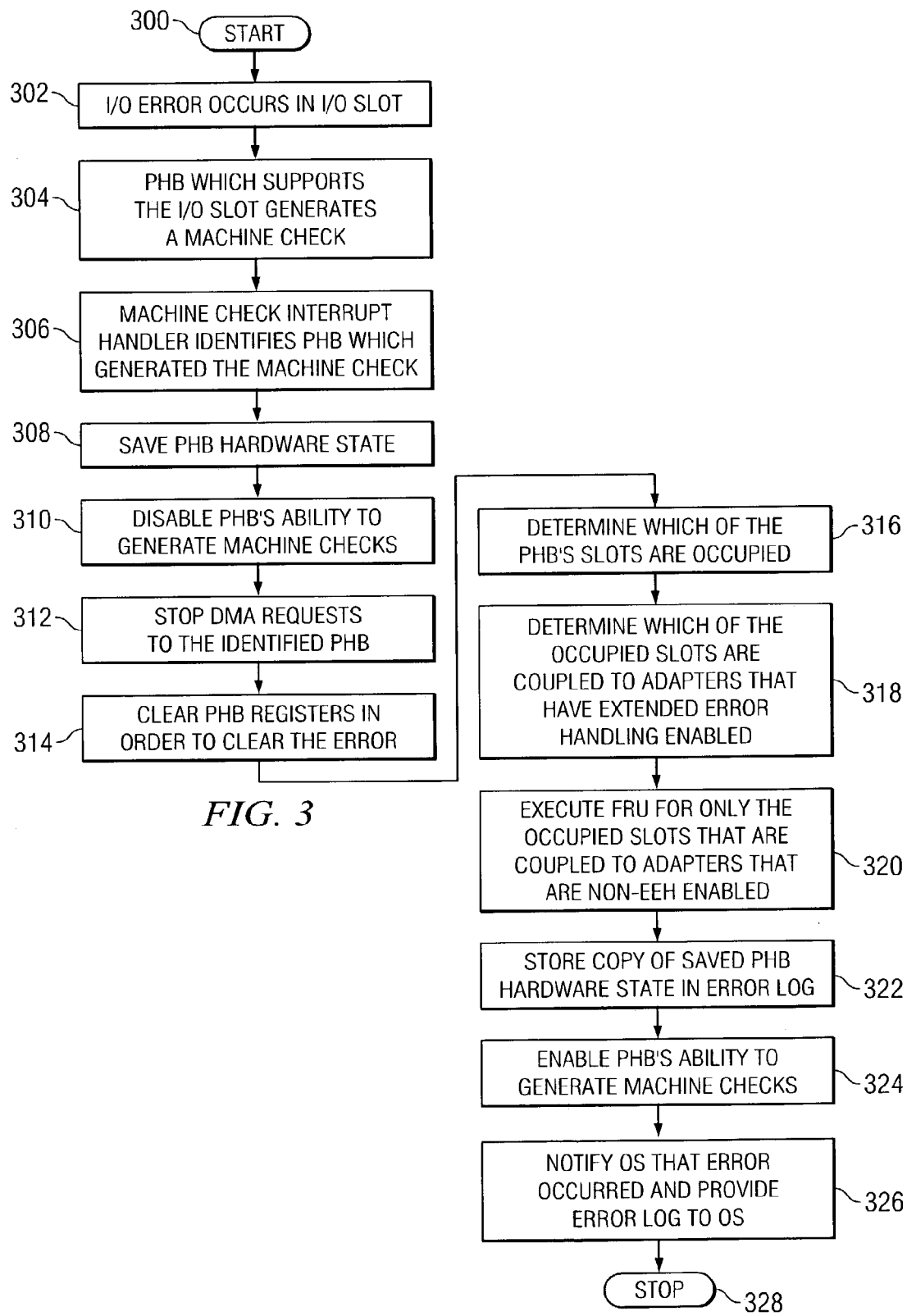
FIG. 3 depicts a high level flow chart which illustrates isolating errors to slots that include adapters that are non-EEH enabled in an identified PCI host bridge in accordance with a preferred embodiment of the present invention.

FIG. 3 depicts a high level flow chart which illustrates isolating errors to slots that include adapters that are non- EEH enabled in an identified PCI host bridge in accordance with a preferred embodiment of the present invention. The process starts as depicted by block 300 and thereafter passes to block 302 which illustrates an input/output (I/O) error occurring in one of the I/O slots. The I/O slot that generated the error is assigned to a particular partition in which a particular operating system is executing. Next, block 304 depicts the PHB that supports the slot in which the error occurred generating a machine check. Block 306, then, illustrates a machine check interrupt handler identifying the particular PHB which generated the machine check. The machine check interrupt handler identifies the particular PHB utilizing error registers.

The process then passes to block 308 which depicts saving the state of the PHB which generated the machine check. The PHB's registers are read and then that data is saved. Block 310, then, illustrates disabling the ability of the particular PHB to generate further machine checks. A PHB generates a machine check by asserting a Derr signal. This signal propagates up to a processor which results in a machine check. To disable a PHB's capability to generate a Derr signal, the PHB Mode0 register bit 30 is set to a logical one. When this bit is set to a logical one, the PHB's capability to generate a Derr, and thus a machine check, is disabled. Thereafter, block 312 depicts stopping direct memory access (DMA) requests to the identified PHB. The arbitration enable register in a PHB may be used to enable or disable DMA requests destined to the PHB. When logical zeros are written to the arbitration register, the PHB's ability to receive and respond to DMA requests is disabled. After the PHB's ability to receive and respond to DMA requests is disabled, the process waits a set period of time in order to make sure any previous activity has stopped on the bus beneath the PHB. Any outstanding DMA requests will be retried or aborted since the PHB is in the error state. Next, block 314 illustrates clearing the registers within the PHB in order to clear the I/O error. The PLSSR, CSR, and PMCHK registers of the PHB are cleared in order to unfreeze the PHB. Writing logical zeros to these registers will cause the PHB's error status to be cleared.

Block 316, next, depicts determining which one of the I/O slots which are coupled to the PHB are occupied. Each EADS includes a register which indicates whether an adapter is coupled to the EADS. The process of determining whether the I/O slots are occupied includes polling this register for each EADS to determine which EADS is coupled to an adapter, and thus which slot is occupied. In a preferred embodiment, this register is the EADS-X 1030 register. The process then passes to block 318 which illustrates determining which one of the occupied slots is occupied with an adapter that has extended error handling enabled. The process of determining whether an occupied slot is occupied with an adapter that includes the EEH ability includes polling a register for each occupied slot to determine if the slot is coupled to an adapter that has EEH enabled. In a preferred embodiment, the EADS-X 1040 register is polled to determine if the slot is coupled to an adapter that is EEH enabled. Thereafter, block 320 depicts executing a field replacement unit call to a service person for only those slots that are occupied and that are coupled to adapters that are not EEH enabled. An error log is generated in response to each error. The process then passes to block 322 which illustrates storing a copy of the saved PHB hardware state in the error log that was generated for this error.

Next, block 324 depicts enabling the ability of the PHB to generate machine checks. Thereafter, block 326 illustrates notifying the operating system that an error occurred and providing the error log to the operating system. The operating system that is notified is the operating system that is executing within the partition to which this I/O slot is assigned. The process then terminates as depicted by block 328.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a logical partitioned data processing system for improving isolation of I/O errors in logical partitioned data processing systems, said method comprising the steps of:
   generating a machine check that indicates that an I/O error has occurred in an I/O slot;
   identifying one of a plurality of PCI host bridges (PHBS) that generated said machine check, said one of said plurality of PHBs supporting said I/O slot;
   each one of said plurality of PHBs being coupled to a different plurality of I/O slots;
   identifying ones of a first plurality of slots that are coupled to adapters that are not enabled for enhanced error handling, said first plurality of slots being coupled to said identified one of said plurality of PHBs; and
   determining that said I/O error occurred in one of said identified ones of said first plurality of slots, wherein said I/O slot is included in said identified ones of said first plurality of slots.

2. The method according to claim 1, further comprising the steps of:
   prior to identifying ones of a first plurality of slots that are coupled to adapters that are not enabled for enhanced error handling, identifying ones of said first plurality of slots that are occupied; and
   polling said identified ones of said first plurality of slots that are occupied to identify said ones that are coupled to adapters that are not enabled for enhanced error handling, wherein said identified ones that are coupled to adapters that are not enabled for enhanced error handling are identified from a group that includes only said identified ones of said first plurality of slots that are occupied.

3. The method according to claim 2, further comprising the steps of:
   accessing a first hardware register in each one of said first plurality of slots that are occupied to determine whether each one of said first plurality of slots that is occupied is coupled to an adapter that is enabled for enhanced error handling.

4. The method according to claim 1, further comprising the steps of:
   accessing a second hardware register in each one of said first plurality of slots to determine whether each one of said first plurality of slots is occupied; and
   accessing a first hardware register in each one of said first plurality of slots that is occupied to determine whether each one of said first plurality of slots that is occupied is coupled to an adapter that is enabled for enhanced error handling.

5. The method according to claim 1, further comprising the step of:
   saving a hardware state of said identified one of said plurality of PHBs after said one of said plurality of PHBs is identified.

6. The method according to claim 1, further comprising the step of:
   disabling an ability of said identified one of said plurality of PHBs to generate machine checks after said one of said plurality of PHBs is identified.

7. The method according to claim 1, further comprising the step of:
   stopping direct memory access requests from being processed by said one of said plurality of PHBs after said one of said plurality of PHBs is identified.

8. The method according to claim 1, further comprising the steps of:
   each one of said plurality of PHBs entering an error state in response to an I/O error occurring in one of its plurality of slots that is coupled to an adapter that is not enabled for enhanced error handling; and
   continuing processing by each one of said plurality of PHBs in response to an I/O error occurring in one of its plurality of slots that is coupled to an adapter that is enabled for enhanced error handling, wherein no machine check is generated by one of said plurality of PHBs when an I/O error occurs in a plurality of slots that are coupled to said one of said plurality of PHBs.

9. The method according to claim 1, further comprising the step of:
   clearing said I/O error from said one of said plurality of PHBs after said one of said plurality of PHBs is identified.

10. The method according to claim 9, further comprising the step of:
    clearing hardware registers included within said one of said plurality of PHBs in order to clear said I/O error from said one of said plurality of PHBs.

11. The method according to claim 1, further comprising the step of:
    executing a service call that identifies only said identified ones of said first plurality of slots.

12. The method according to claim 1, further comprising the step of:
    re-enabling an ability of said identified one of said plurality of PHBs to generate machine checks after said ones of said first plurality of slots are identified.

13. A system for improving isolation of I/O errors in a logically partitioned data processing system, said system comprising:
    one of a plurality of PCI host bridges (PHBs) generating a machine check that indicates that an I/O error has occurred in an I/O slot;
    said logically partitioned data processing system including a processor executing code for identifying said one of said plurality of PHBs that generated said machine check, said one of said plurality of PHBs supporting said I/O slot;
    each one of said plurality of PHBs being coupled to a different plurality of I/O slots;
    said processor executing code for identifying ones of a first plurality of slots that are coupled to adapters that are not enabled for enhanced error handling, said first plurality of slots being coupled to said identified one of said plurality of PHBs; and
    said processing executing code for determining that said I/O error occurred in one of said identified ones of said first plurality of slots, wherein said I/O slot is included in said identified ones of said first plurality of slots.

14. The system according to claim 13, further comprising:
    prior to said processor executing code for identifying ones of a first plurality of slots that are coupled to adapters that are not enabled for enhanced error handling, said processor executing code for identifying ones of said first plurality of slots that are occupied; and
    said processor executing code for polling said identified ones of said first plurality of slots that are occupied to identify said ones that are coupled to adapters that are not enabled for enhanced error handling, wherein said identified ones that are coupled to adapters that are enabled for enhanced error handling are identified from a group that includes only said identified ones of said first plurality of slots that are occupied.

15. The system according to claim 14, further comprising:
    a first hardware register included in each one of said first plurality of slots for identifying whether each one of said first plurality slots is coupled to an adapter that is enabled for enhanced error handling;
    said processor executing code for accessing said first hardware register in each one of said first plurality of slots that are occupied to determine whether each one of said first plurality of slots that is occupied is coupled to an adapter that is enabled for enhanced error handling.

16. The system according to claim 13, further comprising:
    said processor executing code for accessing a second hardware register in each one of said first plurality of slots to determine whether each one of said first plurality of slots is occupied; and
    said processor executing code for accessing a first hardware register in each one of said first plurality of slots that are occupied to determine whether each one of said first plurality of slots that is occupied is coupled to an adapter that is enabled for enhanced error handling.

17. The system according to claim 13, further comprising:
    a hardware state of said identified one of said plurality of PHBs being saved after said one of said plurality of PHBs is identified.

18. The system according to claim 13, further comprising:
    an ability of said identified one of said plurality of PHBs to generate machine checks being disabled after said one of said plurality of PHBs is identified.

19. The system according to claim 13, further comprising:
    direct memory access requests being stopped from being processed by said one of said plurality of PHBs after said one of said plurality of PHBs is identified.

20. The system according to claim 13, further comprising:
each one of said plurality of PHBs entering an error state in response to an I/O error occurring in one of its plurality of slots that is coupled to an adapter that is not enabled for enhanced error handling; and
each one of said plurality of PHBs continuing processing in response to an I/O error occurring in one of its plurality of slots that is coupled to an adapter that is enabled for enhanced error handling, wherein no machine check is generated by one of said plurality of PHBs when an I/O error occurs in a plurality of slots that are coupled to said one of said plurality of PHBs.

21. The system according to claim 13, further comprising:
said I/O error being cleared from said one of said plurality of PHBs after said one of said plurality of PHBs is identified.

22. The system according to claim 21, further comprising:
hardware registers included within said one of said plurality of PHBs being cleared in order to clear said I/O error from said one of said plurality of PHBs.

23. The system according to claim 13, further comprising:
said processor executing code for executing a service call that identifies only said identified ones of said first plurality of slots.

24. The system according to claim 13, further comprising:
an ability of said identified one of said plurality of PHBs to generate machine checks being re-enabled after said ones of said first plurality of slots are identified.

25. A computer program product in a logical partitioned data processing system for improving isolation of I/O errors in logical partitioned data processing systems, said product comprising:
instruction means for generating a machine check that indicates that an I/O error has occurred in an I/O slot;
instruction means for identifying one of a plurality of PCI host bridges (PHBS) that generated said machine check, said one of said plurality of PHBs supporting said I/O slot;
each one of said plurality of PHBs being coupled to a different plurality of I/O slots;
instruction means for identifying ones of a first plurality of slots that are coupled to adapters that are not enabled for enhanced error handling, said first plurality of slots being coupled to said identified one of said plurality of PHBs; and
instruction means for determining that said I/O error occurred in one of said identified ones of said first plurality of slots, wherein said I/O slot is included in said identified ones of said first plurality of slots.

26. The product according to claim 25, further comprising:
prior to identifying ones of a first plurality of slots that are coupled to adapters that are not enabled for enhanced error handling, instruction means for identifying ones of said first plurality of slots that are occupied; and
instruction means for polling said identified ones of said first plurality of slots that are occupied to identify said ones that are coupled to adapters that are not enabled for enhanced error handling, wherein said identified ones that are coupled to adapters that are not enabled for enhanced error handling are identified from a group that includes only said identified ones of said first plurality of slots that are occupied.

27. The product according to claim 26, further comprising:
instruction means for accessing a first hardware register in each one of said first plurality of slots that are occupied to determine whether each one of said first plurality of slots that is occupied is coupled to an adapter that is enabled for enhanced error handling.

28. The product according to claim 25, further comprising:
instruction means for accessing a second hardware register in each one of said first plurality of slots to determine whether each one of said first plurality of slots is occupied; and
instruction means for accessing a first hardware register in each one of said first plurality of slots that are occupied to determine whether each one of said first plurality of slots that is occupied is coupled to an adapter that is enabled for enhanced error handling.

29. The product according to claim 25, further comprising:
instruction means for saving a hardware state of said identified one of said plurality of PHBs after said one of said plurality of PHBs is identified.

30. The product according to claim 25, further comprising:
instruction means for disabling an ability of said identified one of said plurality of PHBs to generate machine checks after said one of said plurality of PHBs is identified.

31. The product according to claim 25, further comprising:
instruction means for stopping direct memory access requests from being processed by said one of said plurality of PHBs after said one of said plurality of PHBs is identified.

32. The product according to claim 25, further comprising:
each one of said plurality of PHBs entering an error state in response to an I/O error occurring in one of its plurality of slots that is coupled to an adapter that is not enabled for enhanced error handling; and
instruction means for continuing processing by each one of said plurality of PHBs in response to an I/O error occurring in one of its plurality of slots that is coupled to an adapter that is enabled for enhanced error handling, wherein no machine check is generated by one of said plurality of PHBs when an I/O error occurs in a plurality of slots that are coupled to said one of said plurality of PHBs.

33. The product according to claim 25, further comprising:
instruction means for clearing said I/O error from said one of said plurality of PHBs after said one of said plurality of PHBs is identified.

34. The product according to claim 33, further comprising:
instruction means for clearing hardware registers included within said one of said plurality of PHBs in order to clear said I/O error from said one of said plurality of PHBs.

35. The product according to claim 25, further comprising:
instruction means for executing a service call that identifies only said identified ones of said first plurality of slots.

36. The product according to claim 25, further comprising:
instruction means for re-enabling an ability of said identified one of said plurality of PHBs to generate machine checks after said ones of said first plurality of slots are identified.

* * * * *